United States Patent

Black

[11] Patent Number: 6,082,612
[45] Date of Patent: Jul. 4, 2000

[54] INTEGRATED FOLDER AND RETAINING POCKET

[75] Inventor: Steven Charles Black, Hastings, Minn.

[73] Assignee: Smead Manufacturing Company, Hastings, Minn.

[21] Appl. No.: 09/048,556

[22] Filed: Mar. 26, 1998

Related U.S. Application Data

[63] Continuation-in-part of application No. 08/787,137, Jan. 22, 1997.

[51] Int. Cl.[7] .................................................. B65D 27/00
[52] U.S. Cl. ............................ 229/67.1; 229/71; 229/72; 206/308.3
[58] Field of Search ............................ 229/67.1, 72, 84, 229/71, 92.3, 300; 206/308.3

[56] References Cited

U.S. PATENT DOCUMENTS

| | | | |
|---|---|---|---|
| 978,956 | 12/1910 | Stewart | 229/71 |
| 999,353 | 8/1911 | Weiler | 229/72 |
| 1,040,004 | 10/1912 | Patton | 229/84 X |
| 1,042,488 | 10/1912 | Shaffer | 229/84 X |
| 1,106,056 | 8/1914 | Rand | 229/71 |
| 1,141,172 | 6/1915 | Clark | 229/71 |
| 1,169,039 | 1/1916 | Kieffer | 229/71 |
| 1,438,122 | 12/1922 | McCoy | 229/71 |
| 2,087,825 | 7/1937 | Vaugh | 229/72 |
| 2,212,587 | 8/1940 | Cronaur | 229/71 |
| 2,341,634 | 2/1944 | Locke | 229/72 |
| 2,568,941 | 9/1951 | Benson | 229/72 |
| 3,030,004 | 4/1962 | Pieronak et al. | 229/72 |
| 3,351,268 | 11/1967 | Schroeder | 229/72 |
| 3,528,602 | 9/1970 | Ritchie . | |
| 3,655,119 | 4/1972 | Thompson | 229/72 |
| 3,847,195 | 11/1974 | Tyrseck | 229/72 X |
| 3,870,223 | 3/1975 | Wyant | 229/72 |
| 3,979,051 | 9/1976 | Close | 229/72 |
| 4,534,581 | 8/1985 | Engh | 229/72 X |
| 4,636,179 | 1/1987 | Gentile et al. | 229/72 X |
| 5,125,561 | 6/1992 | Idstein | 229/72 X |
| 5,141,485 | 8/1992 | Welt . | |
| 5,188,229 | 2/1993 | Bernstein | 206/309 X |
| 5,199,743 | 4/1993 | Rosinski, III . | |
| 5,255,779 | 10/1993 | Koenig, III . | |
| 5,393,157 | 2/1995 | Basmajian . | |
| 5,501,540 | 3/1996 | Ho . | |
| 5,730,284 | 3/1998 | Farrah . | |
| 5,938,022 | 8/1999 | Detloff | 206/308.3 X |

FOREIGN PATENT DOCUMENTS

626692   11/1994   European Pat. Off. .

Primary Examiner—Jes F. Pascua
Attorney, Agent, or Firm—Altera Law Group LLC

[57] ABSTRACT

An integrated pocket folder for holding an article, such as a computer diskette or the like, where the article is held in a secondary pocket created by an opening in the cover of the pocket. In one embodiment of the invention, a folder has a rear pocket cover attached at a folded portion to a front pocket cover to form a pocket therebetween. The folded portion includes a fold of material of at least one of the rear and front pocket cover. The front cover has at least one first cut therethrough, which is positioned on the front pocket cover so as to form a secondary pocket between the cut and an inner surface of the fold. Methods of manufacturing the folder are also presented.

7 Claims, 8 Drawing Sheets

INTEGRATED FOLDER AND RETAINING POCKET

This is a continuation-in-part of application Ser. No. 08/787,137, filed Jan. 22, 1997 pending.

BACKGROUND OF THE INVENTION

This invention relates in general to office supplies and, in particular, to an integrated folder and retaining pocket for holding papers and additional articles.

Office requisites, such as folders and pocket folders are widely used office supplies for holding letters and other documents. Recent developments in office practices have resulted in the need for folders to include the ability to hold other items in addition to the paper documents stored in the pocket of a folder. For example, it may be desirable to hold such articles as a computer diskette, a media storage device, or a photograph, or the like with the folder to supplement the contents of the documents contained within the folder. These additional items should typically be held safely, so that there is a low risk of the item falling out of the folder, and be prominently displayed so that a user can readily identify that the item is present.

In one approach to solving this problem, a separate holder, or pocket, for the particular article may be attached to the folder after the folder has been manufactured. For example, self-adhesive pockets, sized to hold a floppy disk, are available for applying to a folder.

However, there are problems with this approach: it requires either the manufacturer or the user to undergo the additional steps of attaching the holders to the folders. These additional steps either increase the cost of manufacturing the folder, or increase the costs to the user. Either way, the overall costs are higher.

Other approaches have been developed for holding business cards in folders. However, these approaches are not well suited to holding heavier or bulkier items.

Therefore, there is a need to provide folders that can hold such extra items in addition to the papers normally contained therein. The items should be held safely and prominently displayed, and the manner of holding the items should require a small number of manufacturing steps, so as to be easier and less expensive to manufacture.

SUMMARY OF THE INVENTION

To reduce the limitations in the prior art described above, and to reduce other limitations that will become apparent upon reading and understanding the present specification, the present invention is directed to an integrated pocket folder for holding an article, where the article is held in an additional pocket created by an opening in the cover of the pocket. In one embodiment of the invention, a folder has a rear pocket cover attached at a folded portion to a front pocket cover to form a pocket therebetween. The folded portion includes a fold of material of at least one of the rear and front pocket cover. The front cover has at least one first cut therethrough, which is positioned on the front pocket cover so as to form a secondary pocket between the cut and an inner surface of the fold.

In another embodiment of the invention, a folder is made by providing a blank of foldable and cuttable material and cutting at least one first cut in the material blank. The material blank is folded along a first fold line across the blank to form front and rear pocket covers connected at a first fold. The front cover is attached to the rear cover along at least a portion of an edge to form a pocket therebetween, thus forming a secondary pocket between the at least one first cut and the first fold.

In another embodiment of the invention, a folder is made by providing a front pocket cover and a rear pocket cover of foldable and cuttable material and cutting at least one first cut in the front pocket cover. A foldable portion of one of the front pocket cover and the rear pocket cover is attached to the other of the front pocket cover and the rear pocket cover; and the foldable portion is folded at a fold line to form a fold. The fold and the at least one first cut co-operatively form a secondary pocket.

Additional features of the invention include, but are not limited to, a retaining tab on the front cover for retaining the article held in the pocket. The pocket may be cut so as to prevent the upper lip of the first cut from catching on an element on the article retained in the pocket. For example, if the pocket retains a standard 3½ inch diskette, the pocket may be cut to be below the protective sliding portion of the diskette so as to avoid catching the sliding portion. Additionally, the pocket may be cut to expose a large area of the retained article. For example, the pocket may be cut to expose the label of a 3½ inch diskette.

Other features of the folder or pocket folder include an index tab along the side of the folder, and tick marks to secure the die cut flaps forming the pocket and securing tab. Furthermore, the upper portion of the front cover may be cut to be parallel with the top edge of the back cover, so as to expose a greater portion of any documents contained therein.

BRIEF DESCRIPTION OF THE DRAWINGS

Referring now to the drawings in which like reference numbers represent corresponding parts throughout.

DETAILED DESCRIPTION OF THE ILLUSTRATED EMBODIMENTS

In the following description of the illustrated embodiments, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
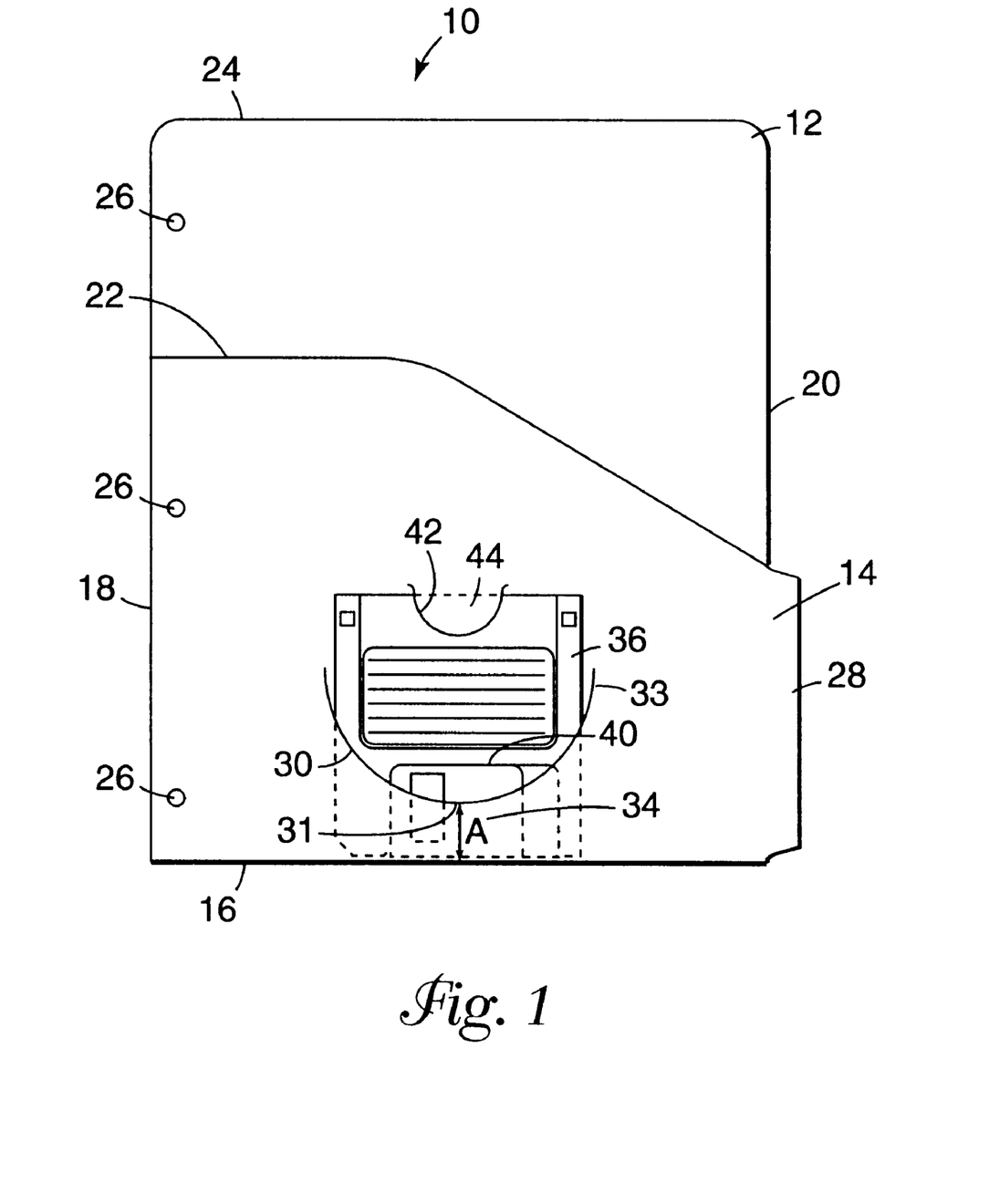
FIG. 1 illustrates one embodiment of a folder according to the present invention.

Folders and pocket folders (also known as slash jackets) are commonplace items in offices. Developments in office practice require that other items, such as computer diskettes and other media storage devices, business cards, brochures, promotional materials, photographs and the like be attached to the folder in a manner so that the user may easily identify the attached item. FIG. 1 illustrates such a folder in the form of a slash jacket 10. Of course, the invention may be implemented in other types of folder or in other office products having a pocket formed between front and back pocket covers. Without implying any limitation to the invention, the invention is described below in the context of implementation on a slash jacket.

The slash jacket has a rear cover 12 and a front cover 14. The front cover 14 is attached to the rear cover 12 along portions of the bottom edge 16 and the left edge 18 and right edge 20, forming a pocket between the rear and front covers 12 and 14. The front and rear covers 14 and 12 may be integrally formed from a single piece of material folded at the bottom edge 16. The front and rear covers 14 and 12 may also be attached by a folding and attaching a flap portion of one of the covers 14 or 12 to the other cover 12 or 14. The front cover 14 covers the lower part of the rear cover 12 so that the top portions of any documents contained within the slash jacket 10, such as letters on letterhead, are visible to the user without having to remove the documents from the slash jacket 10. An advantage of the connection between the front and rear covers 14 and 12 on the right edge 20 being shorter in length than the connection along the left edge 18 is that the ease with which documents may be inserted into the slash jacket 10 is increased.

The slash jacket 10 may also be provided with holes 26 punched along an edge, for example, for a standard three-ring binder. The slash jacket may also be provided with an index tab 28 along a portion of the right edge 20. Such an index tab 28 may be provided on the upper portion of the right edge 20 where the rear cover 12 is not attached to the front cover 14, or may be provided on the lower portion of the right edge 20 where the front and rear covers 14 and 12 are attached, as illustrated in FIG. 1.

A first cut 30 on the front cover 14 produces an upper lip 32 and lower lip 34. The first cut 30 may preferably be a simple die-cut line, cut in the front cover 14 before the slash jacket is assembled. The first cut 30 is cut to be sufficiently wide so that an article may pass therethrough. The first cut 30 forms a secondary pocket with the inner surface of the fold at the bottom edge 16. For example, as shown in FIG. 1, a standard 3½ inch diskette 36 may be inserted through the first cut 30 so as to rest on the inner surface of the fold at the bottom edge 16. The term "secondary pocket" should be understood to be a combination of an opening on a front pocket cover and the inner surface of the fold of a pocket that co-operatively holds an item in place. Other examples of secondary pockets are illustrated hereinbelow. The article inserted into the first cut 30 rests on a folded portion of the folder material.

The first cut 30 may be formed so that the end portions 33 are positioned further from the bottom edge 16 than the center portion 31 of the first cut. An advantage of this arrangement is that it provides increased support for the article contained in the secondary pocket, which is particularly important if the article is heavy or bulky. In addition, by providing the first cut 30 with a center region that is closer to the bottom edge 16 than at the end portions 33, this arrangement allows the user to view a large portion of the article without removing it from the secondary pocket. This is advantageous, for example, where the article is a computer disk 36: the lower center region 31 allows the user to view the label on the disk while the higher end portions 33 provide increased support to the disk.

A second cut 42 may be provided so that the first cut 30 lies between the second cut 42 and the bottom edge 16, and is shaped to form a retaining tab 44. The item to be inserted into the first cut 30 may fit under the retaining tab 44, thus preventing unwanted movement of the retained item by holding the item between the bottom edge 16 and the retaining tab 44. Where a 3½ inch diskette 36 is retained in the slash jacket 10, the retaining tab 44 may be located in a position central relative to the first cut 30. The retaining tab 44 is positioned relative to the bottom edge 16 so that the tab 44 overlaps the diskette 36 when the diskette 36 is placed within the secondary pocket.

In the embodiment illustrated, the end portions 33 of the first cut 30 are spaced from the bottom edge 16 by a distance more than 50% of the distance between the bottom edge 16 and the retaining tab 44. The center portion 31 is spaced from the bottom edge 16 by a distance, A, that is less than 50% of the separation between the retaining tab 44 and the bottom edge 16.

If the article to be retained in the pocket contains an element which may catch on the upper lip 32 when being removed from the pocket, then the first cut 30 is preferably formed so that the distance A, between the first cut 30 and the bottom edge 16, is less than the separation between that element and the bottom edge 16. In this manner, the article may be removed from the pocket without catching on the element and possibly causing damage to either the folder or the article. For example, where the article to be retained is a 3½ inch diskette 36, the slidable disk protector 40 may catch on the upper lip 32 when the diskette 36 is removed unless the first cut 30 is formed so that the upper lip 32 is below the upper edge of the protector 40. Such positioning of the upper lip 32 reduces the possibility that the upper lip 32 interferes with the protector 40 when the diskette is extracted from the pocket. The distance, A, between the center portion 31 and the bottom edge 16 is preferably less than about 1⅜ inches. In other words, the distance A is less than about 40% of the distance between the retaining tab 44 and the bottom edge 16. Thus, the diskette 36 may easily be removed from the secondary pocket without damaging either the protector 40 or the upper lip 32.

Of course, it will be appreciated that more than one retaining tab 44 may be provided by forming a plurality of second cuts 42.

Figure 2:
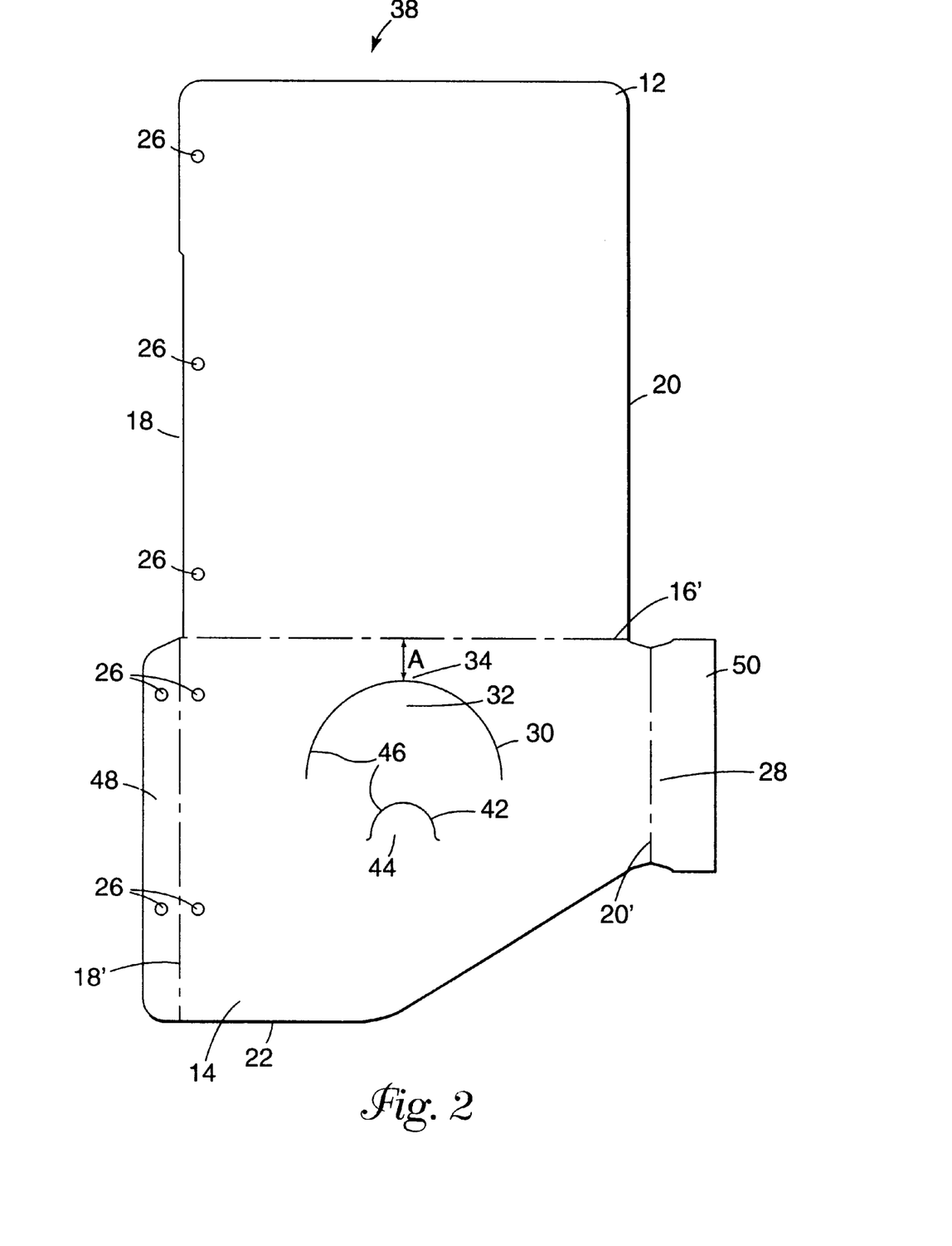
FIG. 2 illustrates an example of a pre-shaped form prior to assembling into one embodiment of a folder according to the present invention.

FIG. 2 illustrates an example of a precut form 38 from which the slash jacket 10 illustrated in FIG. 1 may be fabricated. The form 38 is die-cut from a blank sheet of pliable material, preferably card, heavy paper, plastic, a laminate, or other like material. The step of die-cutting cuts the exterior shape of the form 38 and may also provide the first and second cuts 30 and 42. Assembly includes forming a first fold 16' along what will become the bottom edge 16 so that the front cover 14 is in contact with the rear cover 12. Flaps 48 and 50 are provided on the left and right sides respectively for folding along lines 18' and 20' and attached to the rear cover 12 to form the slash jacket. The first and second cuts 30 and 42 may be provided with tick-marks 46 at spaced intervals to secure the first and second cuts 30 and 42 until they are required by a user, at which time the tick-marks 46 may be broken so as to open the respective cut.

The form 38 may be cut so that the front cover 14 and rear cover 12 are attached at a folded edge along the right edge 20 or left edge 18. In this case, the bottom edge 18 is formed by a fold between the front cover and a flap which is folded and attached to the rear cover 12.

Figure 3:
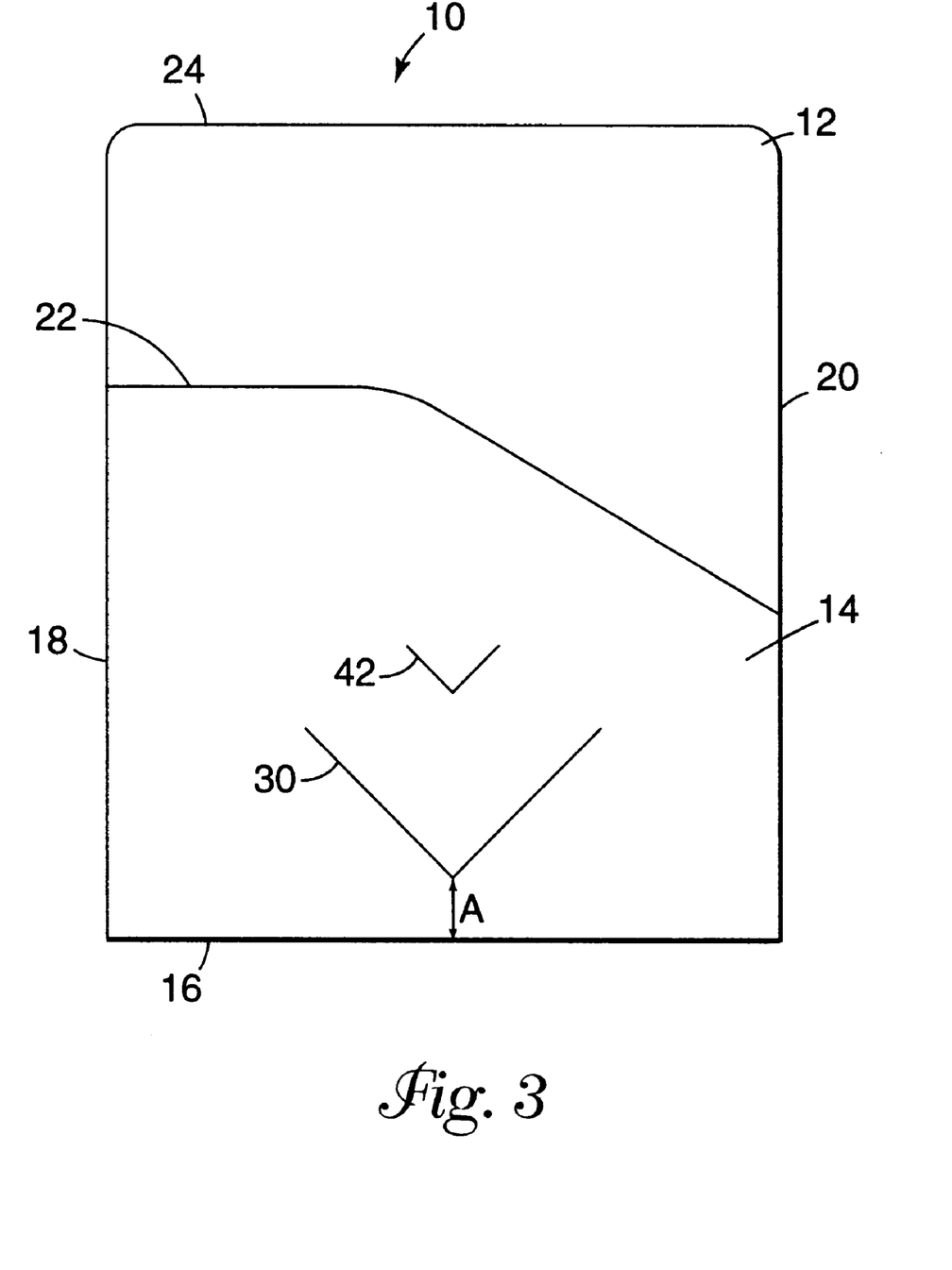
FIGS. 3–5 illustrates folders having cuts of different shapes and placement to form different embodiments of secondary pocket.
Figure 4:
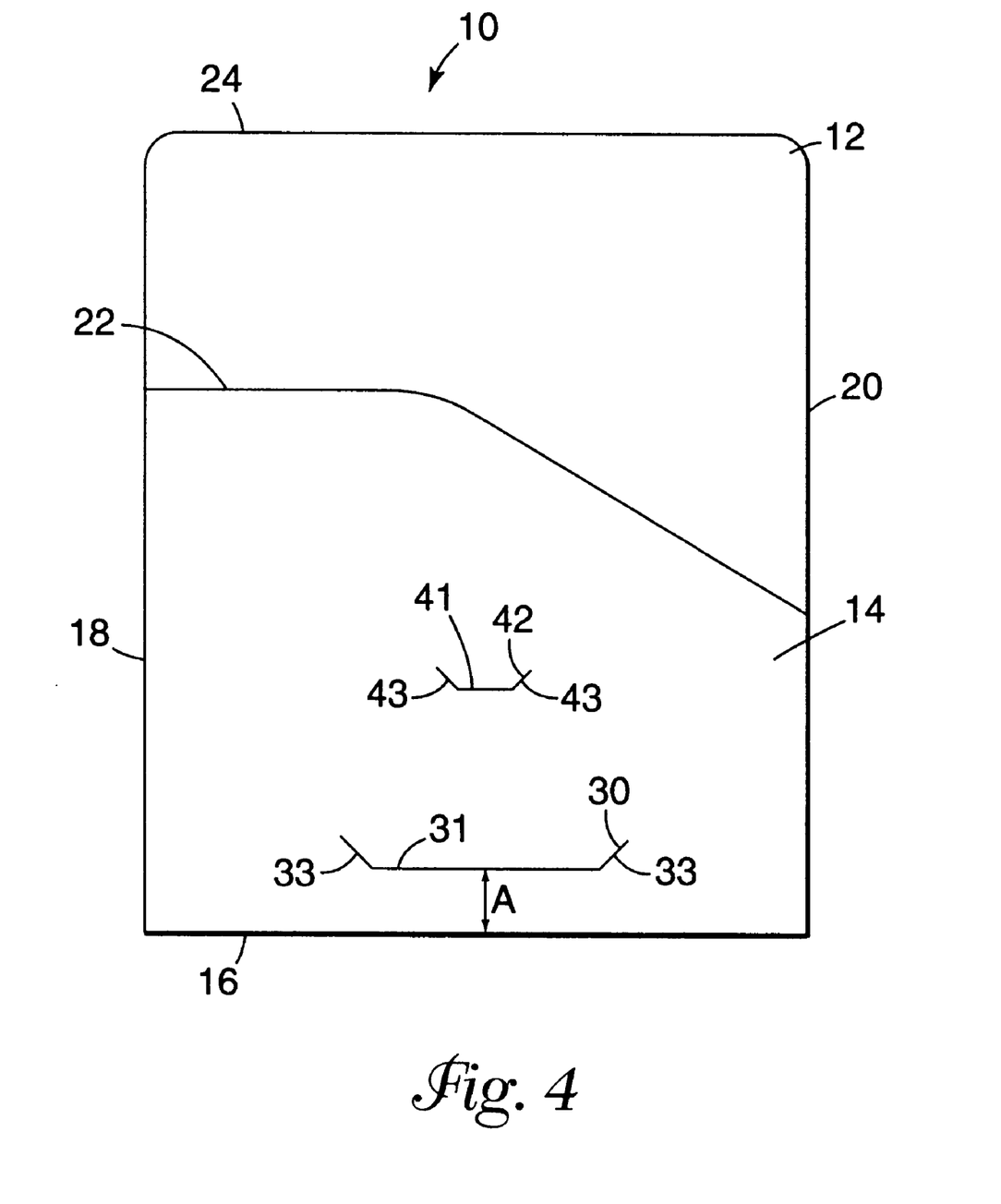

The first and second cuts 30 and 42 need not be arcuate, but may be of different geometries. For example, as illustrated in FIG. 3, the first and second cuts 30 and 42 may be formed from two straight lines to produce a triangular upper lip 32 or, as illustrated in FIG. 4, may be formed so as to have central cut portions 31 and 41 respectively, intermediate sloping end cut portions 33 and 43 respectively.

Irrespective of the shapes of the first and second cuts 30 and 42, it is preferable that dimension A is such that the upper lip 32 lies lower than any catchable elements on the article retained in the pocket so as to prevent the upper lip 32 catching on the element when extracting the article.

Figure 5:
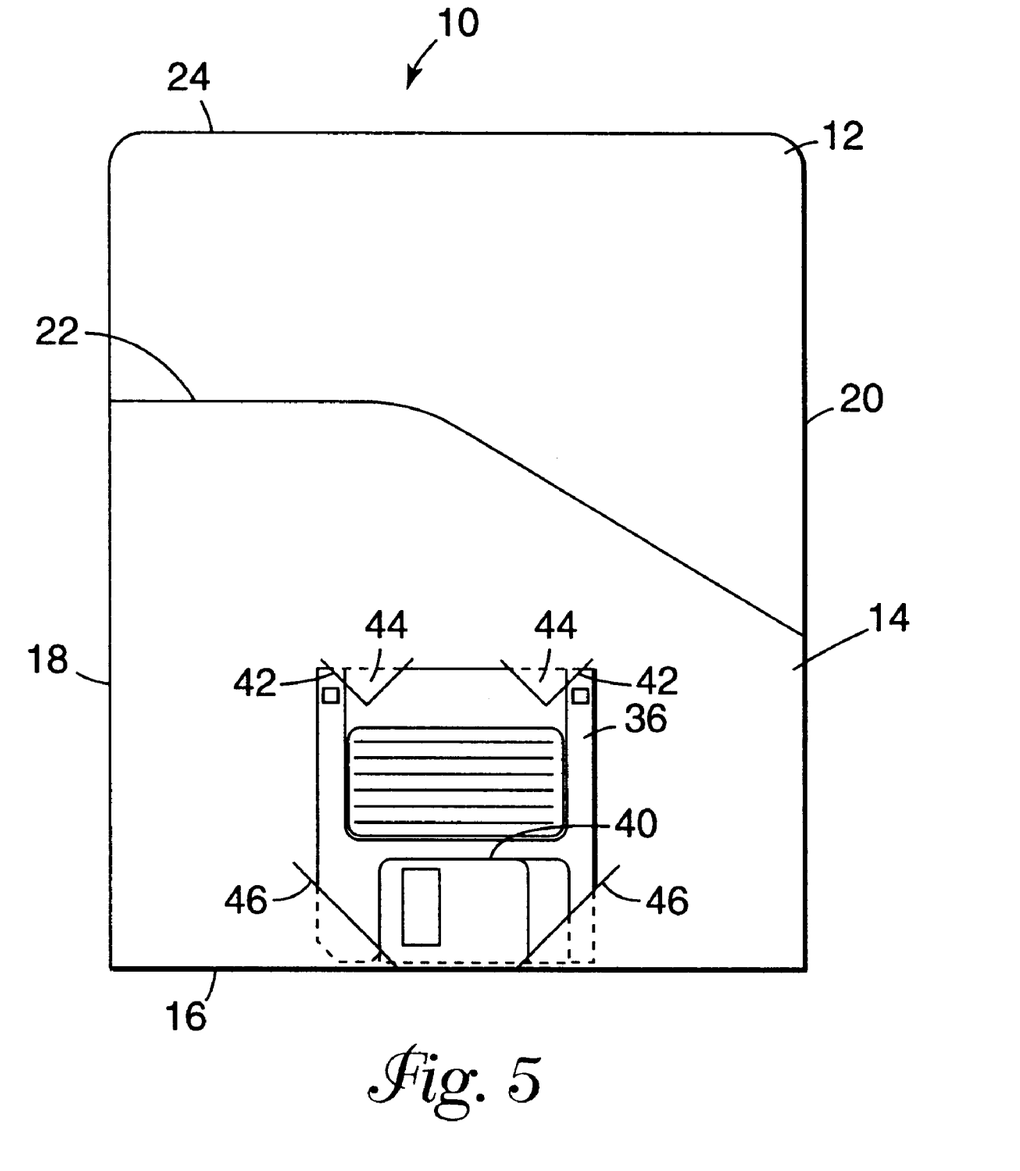

An alternative embodiment illustrated in FIG. 5 shows a slash jacket 10 where two separate cuts 46 extend down to the bottom edge 16 to form openings which receive the lower corners of the 3½ inch diskette 36. Since the separate cuts 46 extend to the bottom edge 16, the corner portions of the diskette 36 received through the separate cuts 46 sit on the inside of the bottom edge 16. If the separate cuts 46 were not to extend to the bottom edge 16, the separate cuts 46 would provide the only support for the diskette 36 and they would be in danger of tearing under the strain. The slash jacket 10 is illustrated to have two tabs 44, although fewer or more than two tabs may be used.

Although the invention has been described in terms of its application in a slash jacket, the invention is not limited to a slash jacket, and may be used in other types of folder that include a pocket. For example FIGS. 6–9 illustrate different types of folders with pockets that are further provided with a secondary pocket.

Figure 6:
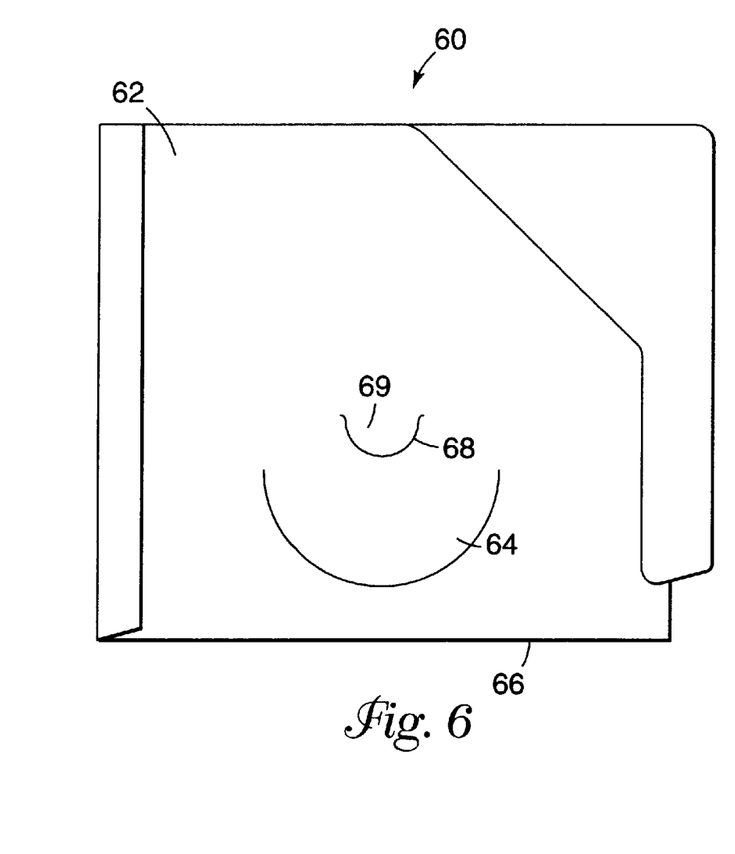
FIGS. 6–9 illustrate different forms of folder provided with a secondary pocket according to the present invention.

FIG. 6 illustrates a file jacket 60, for example as sold by Smead Manufacturing as the ET2-4900 series of file jackets. The front cover 62 of the file jacket 60 is provided with a first cut 64 to form a secondary pocket with the lower, folded edge 66, and a second cut 68 to form a retaining tab 69.

Figure 7:
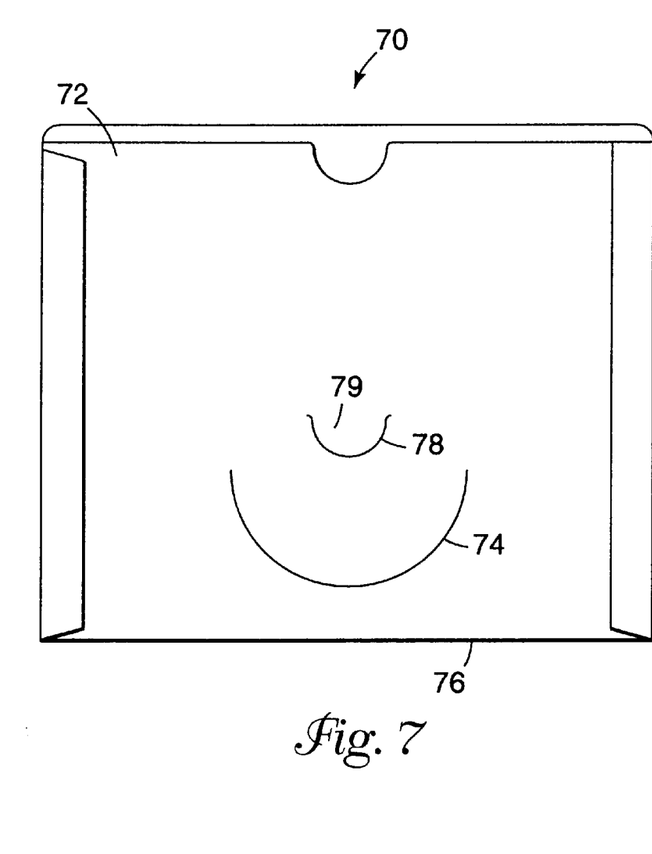

FIG. 7 illustrates a dental style file jacket 70, for example as sold by Smead Manufacturing as the ET2-5100 file jacket. The front cover 72 of the dental style file jacket 70 is provided with a first cut 74 to form a secondary pocket with the lower, folded edge 76, and a second cut 78 to form a retaining tab 79.

Figure 8:
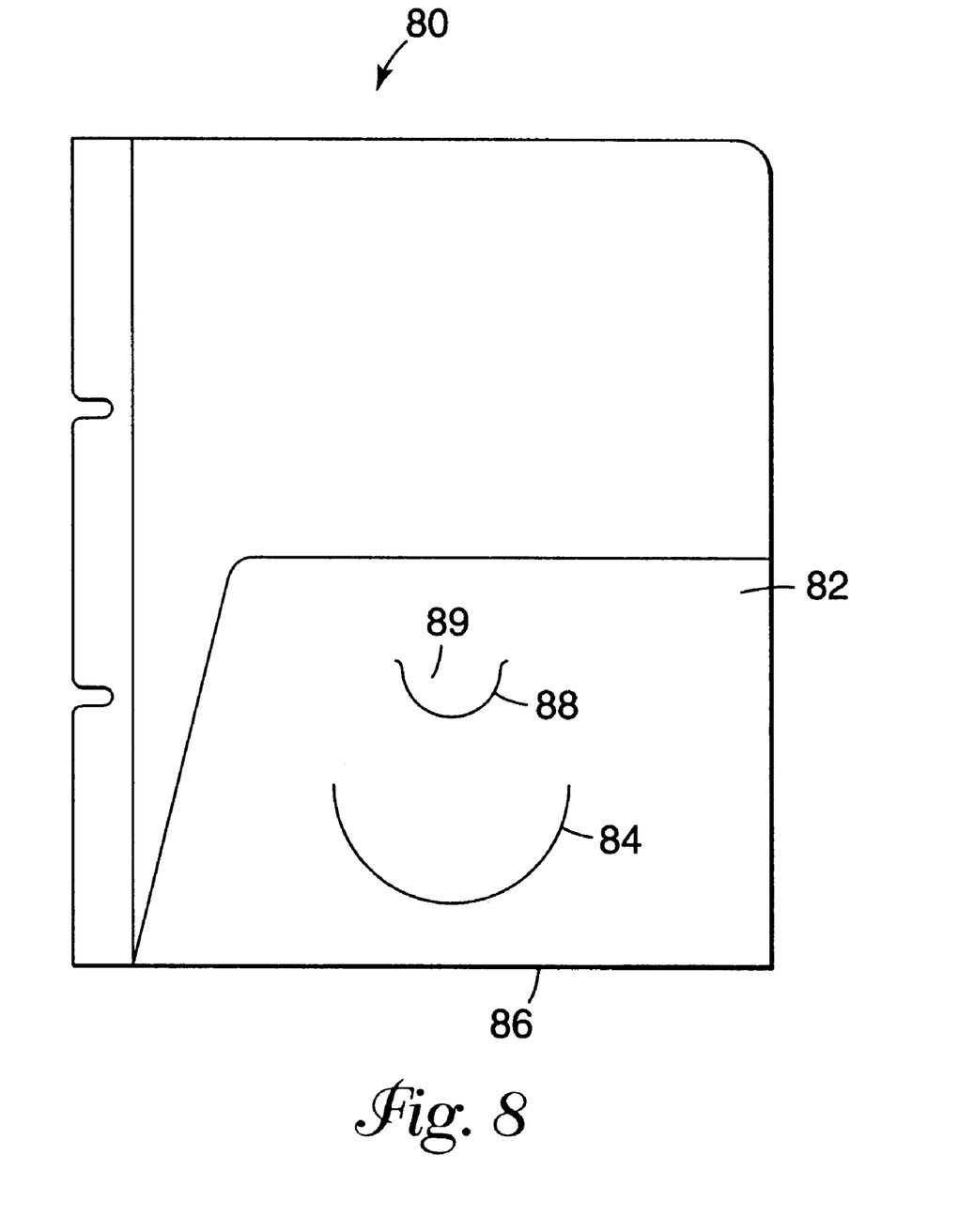

FIG. 8 illustrates a self-adhesive folder divider 80, for example as sold by Smead Manufacturing as the SFP 11SAB folder divider. The front cover 82 of the folder divider 80 is provided with a first cut 84 to form a secondary pocket with the lower, folded edge 86, and a second cut 88 to form a retaining tab 89.

Figure 9:
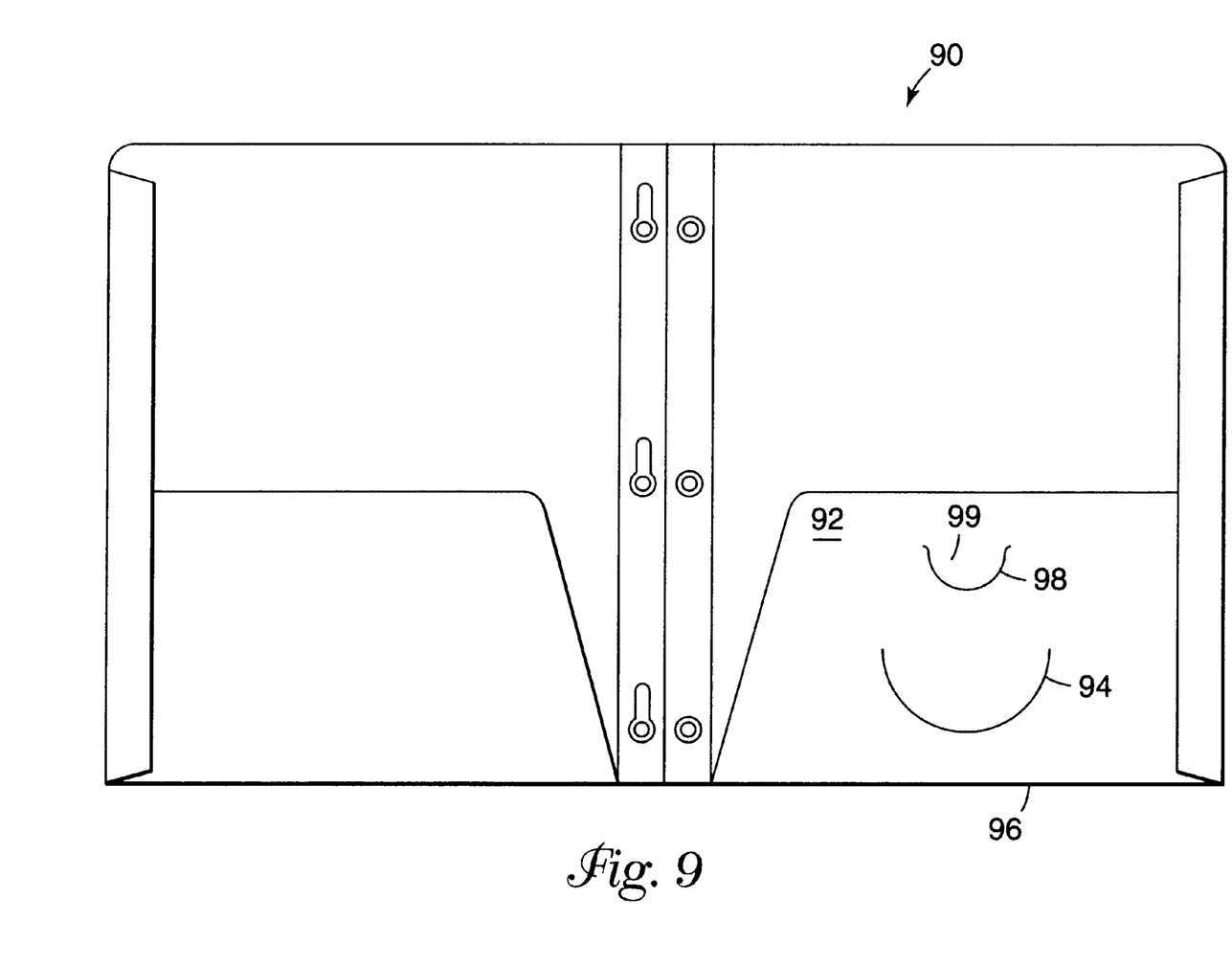

FIG. 9 illustrates a one-piece pocket portfolio with fasteners 90, for example as sold by Smead Manufacturing as the T3863 series of portfolios. The front pocket cover 92 of the portfolio 90 is provided with a first cut 94 to form a secondary pocket with the lower, folded edge 96, and a second cut 98 to form a retaining tab 99.

In summary, a folder has been described which provides a secondary pocket that uses a cut in a front pocket cover and a folded connection between the front and rear pocket covers. Although the figures illustrated the use of the secondary pocket to hold a standard 3½ inch diskette, the invention is not limited to holding this type of article and may hold other types of article, such as large capacity storage diskettes, compact disks and other storage media, photographs and business cards. The secondary pocket is easily manufactured using a die-cutting step which may take place simultaneously with manufacture of the form from which the folder is to be made. The secondary pocket does not require the addition of extra material over and above that used for the form of the folder, thus reducing the number of manufacturing steps required. In addition, although the secondary pocket has been illustrated to have a simple slit cut into the front cover, the secondary pocket may instead use a hole cut into front pocket, where the hole has a specific shape to receive the intended article. Like the slit, such a hole in the front cover may also be formed using a single die-cutting step.

The foregoing description of the preferred embodiment of the invention has been presented for the purposes of illustration and description. It is not intended to be exhaustive or to limit the invention to the precise form disclosed. Many modifications and variations are possible in light of the above teaching. For example, the retaining pocket is not required to be positioned along a bottom edge of the folder, and may be positioned along a different edge. It is intended that the scope of the invention be limited not by this detailed description, but rather by the claims appended hereto.

What is claimed is:

1. A folder, comprising:
   a first cover and a second cover interconnected at a folder edge so as to form a primary pocket between the first and second covers, the front cover including a first cut to form a tab portion and second cut positioned between the first cut and the folder edge and extending through the front cover to cooperate with an interior surface of the folder edge to form a secondary pocket, the second cut including at least one end portion and a center portion, wherein a separation distance between the center portion and the folder edge is less than approximately 50% of a separation distance between the tab portion and the folder edge, and a separation distance between the end portion and the folder edge is greater than approximately 50% of the separation distance between the tab portion and the folder edge.

2. The folder of claim 1, wherein the second cut has two end portions separated by the center portion, both end portions being spaced further from the folder edge than the central portion.

3. The folder of claim 1, wherein a separation distance between the center portion and the folder edge is less than approximately 40% of a separation distance between the tab portion and the folder edge.

4. The folder of claim 1, further comprising tick marks on the second cut so as to prevent the second cut from opening until intentionally opened by a user.

5. The folder of claim 1, wherein the front and rear covers are integrally formed from one sheet of foldable material, and the folder edge comprises a fold between the front and rear covers.

6. The folder of claim 1, wherein one of the front and rear pocket covers is provided with a tab portion folded and attached to the other of the front and rear covers, and the folder edge includes a fold between the tab portion and the one of the front and rear covers.

7. The folder of claim 1, wherein the folder is one of a slash jacket, a file jacket, a dental-style file jacket, a folder divider and a pocket portfolio.

\* \* \* \* \*